Dec. 22, 1942.        H. KEMPF        2,305,789
SPEED AND BRAKING DISTANCE INDICATOR
Filed July 24, 1939        2 Sheets-Sheet 1

Inventor:
Hermann Kempf
BY
Richards & Geier
ATTORNEYS

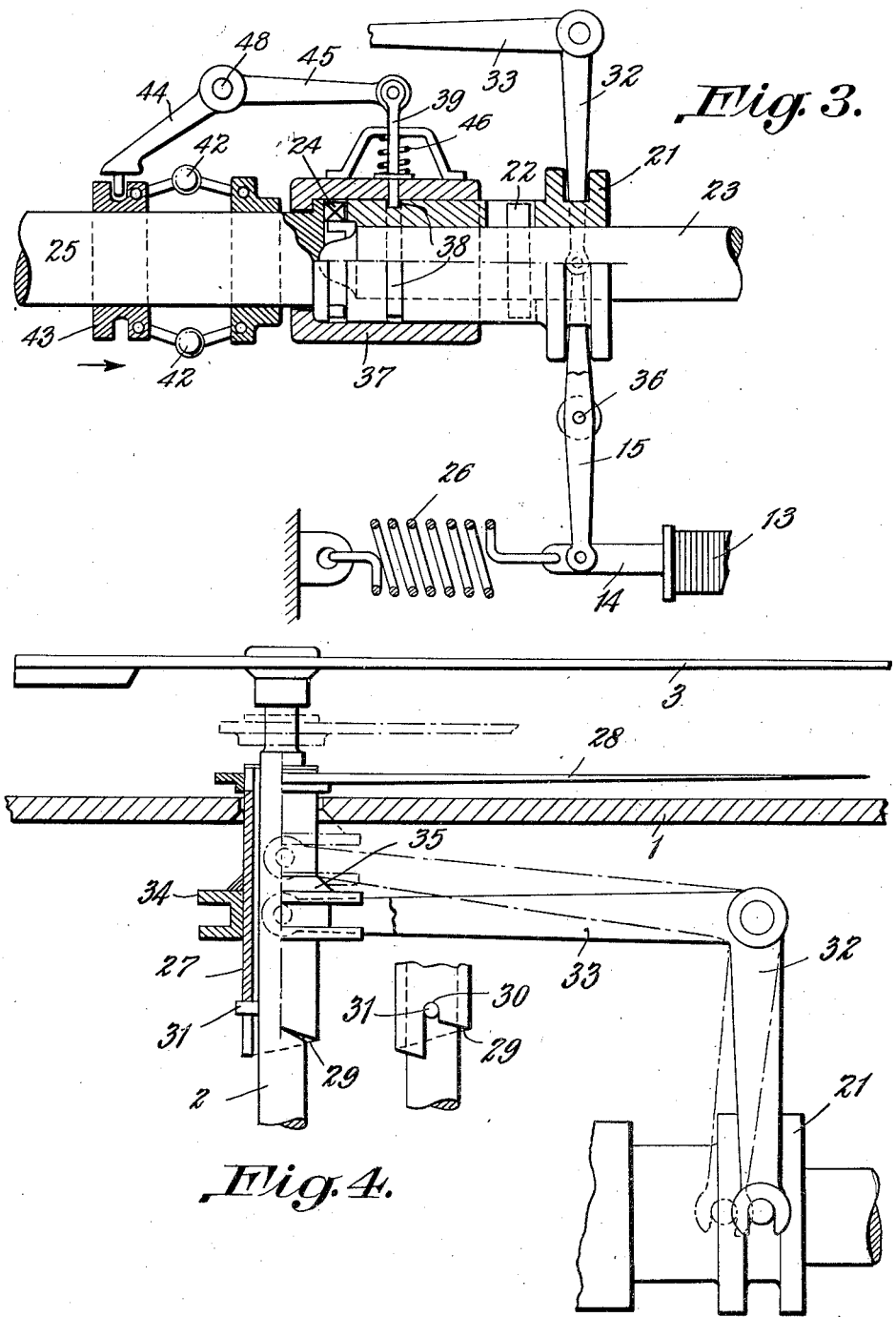

Patented Dec. 22, 1942

2,305,789

UNITED STATES PATENT OFFICE 2,305,789

SPEED AND BRAKING DISTANCE INDICATOR

Hermann Kempf, Stuttgart, Germany; vested in the Alien Property Custodian

Application July 24, 1939, Serial No. 286,225
In Germany July 25, 1938

4 Claims. (Cl. 73—51)

The invention relates to a device by means of which the driver of a motor car is enabled to continually control the speed of his vehicle according to the regulations about the minimum braking retardation, and at the same time to regularly supervise the condition of his brakes or their manner of action, also while driving.

For this purpose serves, according to the invention, a special meter or road distance meter which is automatically actuated together with the brakes, for instance by coupling it with the speed indicator, by means of an electro magnet, connected in the circuit of the stop light, in such manner that it records or indicates with each braking action the road distance covered from its beginning to its end.

This indicator and its drive may preferably be built within the speed indicator supplied with every motor car.

In order to prevent that the single stop distances be added to each other at successive braking operations, the counting mechanism is reduced to the zero position, either by hand by means of a suitable device or through the action of a well known device which is actuated when the braking operation ends or when the car is started anew.

A further feature of the invention consists in the possibility of connecting the measuring and indicating device for the stopping distance with a well known additional device permitting the driver of the car to ascertain the allowable stopping distance for a certain speed and giving him at the same time the possibility of supervising the proper condition of the brakes.

The distances travelled by a moving mass at an acceleration or a retardation $b$, within a certain time $t$ is calculated, as is known, according to the formula:

$$s = b\frac{t}{2}$$

If the velocity at starting is called $v_a$ and the final velocity is called $v_e$ we can substitute:

$$s = \frac{v_a + v_e}{2} \cdot t,$$

consequently when the braking is completed ($v_e = 0$)

$$s = \frac{v_a}{2} \cdot t$$

As however $$v = b \cdot t$$

that is $$t = \frac{v}{b}$$

and by substituting this equation into the second one $$s = \frac{v^2}{2b}$$

This formula shows the well known fact, that the stopping distance is a function of the driving velocity and of the retardation and that it increases with square of the driving velocity.

With this formula the stopping distance pertaining to every driving speed can be calculated under the supposition of a certain retardation. With a retardation of 3.85 the stopping distance in meters is calculated as the square of that number which indicates the speed per hour in kilometers.

If these values are indicated in a well known manner on the dial of the speed indicator next to the marks for the driving speed, the driver can read without difficulty the allowable stopping distance required at a certain driving speed, from the moment of braking to the stopping on an even road. Going down an incline or if the road is in unfavorable condition, the indicated values are to be altered correspondingly.

With the indicating device according to the invention another device may be combined which indicates in any case the driving speed at which the braking action has begun. In its simplest form this device consists in an arrangement which stops the pointer of the speedometer at the beginning of the braking operation i. e. at the time when the count-works of the stopping distance meter are operated, and which disengages this pointer when it is moved to its zero position.

A second pointer however may be provided in the casing of the speedometer which is set at an identical position with the pointer of the speedometer, and which rotates together with the speedometer pointer and is preferably covered by same, but which is so connected with the count-works of the stopping distance meter, that at the beginning of a braking operation it is automatically disengaged of the speedometer pointer, and is stopped in its position, reached in this moment. By means of this pointer or of the stopped speedometer pointer it is possible to ascertain at which driving speed the braking operation started, and by comparing it with the performed stopping distance, the braking retardation may be calculated. This auxiliary pointer or the stopped speedometer pointer may be brought back to their normal position by the action of a spring or by the force of gravity, at the end of the braking operation, either by hand or automatically, or when the car is started anew.

Further auxiliary devices serve, after the termination of a braking operation, to stop the count-works which preferably return automatically to the zero position.

An example of execution of the indicating device according to the invention is described in the following statement, taking reference to the enclosed drawing. In the drawing Figure 1 shows diagrammatically the stopping distance meter built together with a speed indicator, which latter is shown in a vertical cross section.

Figure 3 is view on an enlarged scale of the coupling, putting back and stopping device for the count-works of the stopping distance meter, partly shown in section.

Figure 4 shows the stopping device for the auxiliary pointer to be stopped, partly in section.

Figure 1:
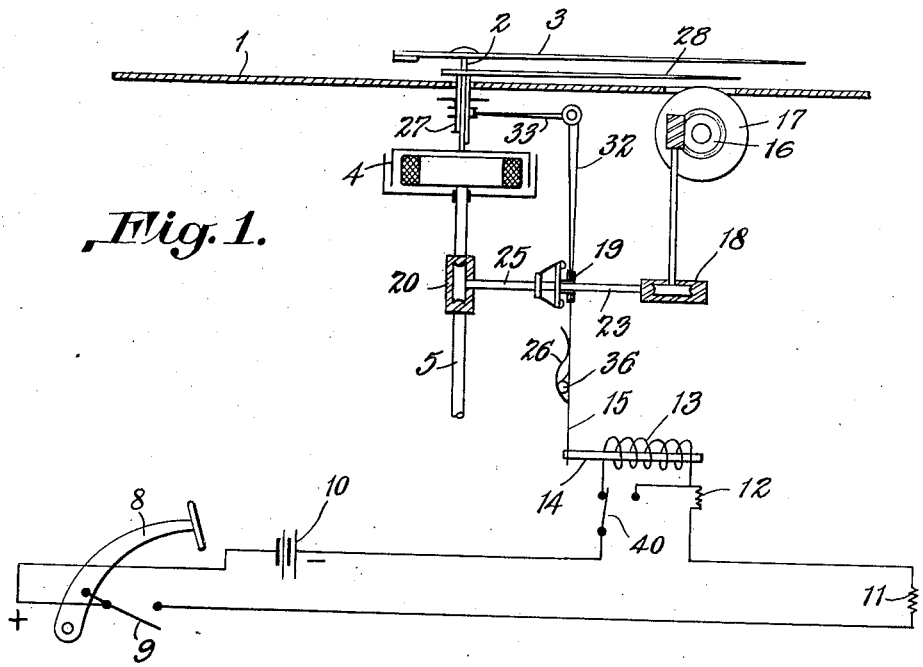

Above the dial 1 of the speed indicator moves a hand 3 mounted on the shaft 2 driven by the mechanism 4 connected to the shaft 2.

The speed indicator is driven by the driving shaft 5. The driving speed in kilometers per hour is read in a well known manner on the scale 6, while the entire driving distance is recorded by means of the kilometer count-mechanism 7.

In putting down the brake pedal 8, by means of the so called stop-switch 9 an electric circuit connected to a source of current 10 is closed, in which lies the brake light 11. Connected to the same circuit are a signal lamp 12 mounted on the dashboard of the car or on the dial of the speedometer, and the winding 13 of an electro magnet the core 14 of which is connected to a two armed control lever 15 of the stopping distance meter, which lever is rotatable around the axle 36.

By means of the signal lamp 12 the driver can supervise the proper working of the brake light at the rear of his vehicle which is not visible to him. A switch 40 (see Figures 1 and 2) makes it possible to switch off the coil 13 if desired and to set the stopping distance meter at rest.

The stopping distance meter consists essentially of a count-work 16 with the figure drum 17 which may be coupled by means of a worm gear 20 to the driving shaft 5 of the speed indicator. The coupling is effected, for instance, by means of the sleeve 21 which can be axially moved by the control lever 15 and which connects, as shown in Figure 3, through a driving pin 22 the shaft 23 through the claws 24 with the shaft 25 and by these means with the speedometer drive 5, when the magnet core 14 is drawn into the coil 13, i. e. when brake is actuated. The sleeve 21, and with it the shaft 23 and the shaft 25 are guided in a rigid guiding sleeve 37 serving at the same time as coupling case. The sleeve 21 is provided inside the sleeve 37 with a cylindrical ring shaped groove 38 into which engages, in the position shown in Figure 3, the pin 39 under the pressure of the spiral spring 46, by which means an undesired loosening of the coupling of the shafts 23 and 25 is prevented.

The arrangement is thus made, that an uncoupling and by these means a returning of the count-works of the stopping distance meter is accomplished when, after stopping, the car is re-started.

Figure 2:
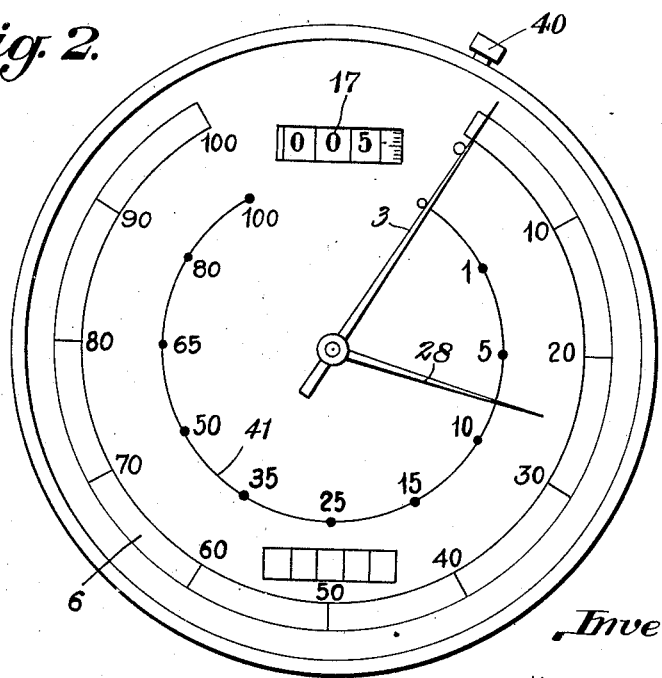
Figure 2 is a front view of the corresponding speed indicator.

This automatic uncoupling operation is effected by means of a centrifugal controller, diagramatically shown in Figure 1 and by means of the device in Figure 3. If in the position of the parts shown in Figure 3 the shaft 25 is again set in rotation, the movable sleeve 43 of the centrifugal controller is moved by means of the weights 42 in the direction of the arrow and the bellcrank lever 44, 45, engaging with its free end a groove of the sleeve 43, and pivoting around the axle 48 is actuated to draw the pin 39, against the pressure of the spring 46, out of the circular cylindrical groove 38. By these means, through the action of the spring 26 upon the two armed lever 15 a back motion of the sleeve 21 is effected and therewith an uncoupling of the shafts 23 and 25. At the same time the count-works 17 are freed and may be reduced to zero-position preferably automatically by well known means.

On the scale 41 which is arranged concentrically to the scale 6 of the speed indicator, the individual stopping distances for the corresponding driving speeds may be read. Fastened to the shaft 2 of the pointer of the speed indicator is an axially movable sleeve 27 protruding through the dial 1 and carrying the auxiliary pointer 28. The sleeve 27 has at its lower end an inclined face 29, similar to a thread and a notch 30 into which engages, in the position shown on Figure 4 in solid lines, a driving pin 31 mounted on the shaft 2, by means of which the sleeve 27 and through it the auxiliary pointer 28 are coupled with the pointer 3 of the speed indicator or the pointer shaft 2 of the same, so that both pointers rotate in identical positions, when the car is in free drive i. e. if the brakes are not put on. If the brake pedal 8 is actuated, and the stopping distance meter is operated in the manner described above, by the coupling sleeve 21, the bellcrank lever 32/33 is rotated also, so that it lifts the sleeve 27 by means of a collar 34 fastened to it, and with the sleeve 27 the auxiliary pointer 28. By these means the sleeve 27 and the auxiliary pointer 28 are disengaged from the pointer shaft 2 (see the dotted lines shown in Figure 4) and are held in that position, in which the braking operation is started, so that the driving speed at the beginning of the braking operation and the allowable stopping distance may be read on the scales 6 and 41.

By means of a conical braking face 35 arranged on the sleeve 27 which lies in a corresponding recess in the dial 1, an undesired turning of the auxiliary pointer 28 may be safely prevented in this position, also vibrations and the like.

With the coupling sleeve moving back, the pointer 28 also returns automatically to the original position, the pointer sleeve 27 being rotated by means of the inclined face, and after engagement of the notch 30 with the driver pin 31 it is covered again by the pointer 3.

The indicating device according to the invention not only allows a continuous automatic indication of the condition of the brake of the car, but in case of accidents it may act as an important means for the driver for proving his correct behaviour, as it automatically indicates at what speed he began to put on the brakes and how long the stopping distance was until the car stopped, also in case the stopping was caused by meeting an obstacle.

What I claim is:

1. In a brake tester unit for an automobile, in combination, with a speed indicator having a scale, a pointer movable over said scale and an indicator shaft for actuating said pointer; count works for registering the distance the automobile has travelled after the brake has been applied, an auxiliary pointer movable over said scale for indicating the allowable stopping distance for the driving speed, means for operatively connecting and disconnecting the two pointers and comprising means moving the auxiliary pointer in alinement with the speed indicator pointer when the two pointers are connected; means connecting said shaft with the first-named pointer and with said connecting and disconnecting means, means for connecting said count works with said shaft and for disconnecting said count works from said shaft, means connected with the second connecting and disconnecting means for disconnecting said count works from said shaft when the automobile is started, and means engaging the two connecting and disconnecting means for operating them simultaneously when the brake is applied to disconnect said pointers and connect said count works with said shaft.

2. In a brake tester unit for an automobile, in combination, with a speed indicator having a scale, a pointer movable over said scale, and a pointer shaft carrying said pointer and rotatable therewith; count works for registering the distance the automobile has travelled after the brake has been applied, an auxiliary pointer movable over said scale for indicating the allowable stopping distance for the driving speed, a sleeve mounted upon said pointer shaft and carrying said auxiliary pointer, means for operatively connecting said sleeve with said pointer shaft and for disconnecting said sleeve from said pointer shaft, said means comprising means moving the auxiliary pointer in alinement with the speed indicator pointer when the two pointers are connected, an indicator shaft, means connecting said indicator shaft with said pointer shaft, means for connecting said count works with said indicator shaft and for disconnecting said count works from said indicator shaft, means connected with the second connecting and disconnecting means for automatically disconnecting said count works from said indicator shaft when the automobile is started, and means engaging the two connecting and disconnecting means for operating them simultaneously when the brake is applied to disconnect said pointers and connect said count works with said indicator shaft.

3. In a brake tester unit for an automobile, in combination, with a speed indicator having a scale, a pointer movable over said scale, and an indicator shaft for actuating said pointer; count works for registering the distance the automobile has travelled after the brake has been applied, an auxiliary pointer movable over said scale for indicating the allowable stopping distance for the driving speed, means for operatively connecting and disconnecting the two pointers and comprising means moving the auxiliary pointer in alinement with the speed indicator pointer when the two pointers are connected; means connecting said shaft with the first-named pointer and with said connecting and disconnecting means, means for connecting said count works with said shaft and for disconnecting said count works from said shaft and comprising locking means operable when said count works are connected with said shaft, and means shifting said locking means to an inoperable position and actuating the second connecting and disconnecting means for disconnecting said count works from said shaft when the automobile is started; and means engaging the two connecting and disconnecting means for operating them simultaneously when the brake is applied to disconnect said pointers and connect said count works with said shaft.

4. In a brake tester unit for an automobile, in combination, with a speed indicator having a scale, a pointer movable over said scale, and an indicator shaft for actuating said pointer; count works for registering the distance the automobile has travelled after the brake has been applied, an auxiliary pointer movable over said scale for indicating the allowable stopping distance for the driving speed, means for operatively connecting and disconnecting the two pointers and comprising means moving the auxiliary pointer in alinement with the speed indicator pointer when the two pointers are connected; means connecting said shaft with the first-named pointer and with said connecting and disconnecting means, means for connecting said count works with said shaft and for disconnecting said count works from said shaft and comprising locking means operable when said count works are connected with said shaft, a centrifugal controller shifting said locking means to an inoperable position and yieldable means actuating the second connecting and disconnecting means for disconnecting said count works from said shaft when the automobile is started; and means engaging the two connecting and disconnecting means for operating them simultaneously when the brake is applied to disconnect said pointers and connect said count works with said shaft.

HERMANN KEMPF.